United States Patent [19]

Pollia

[11] 4,448,448
[45] May 15, 1984

[54] COUPLING SYSTEM

[75] Inventor: Andrew A. Pollia, San Francisco, Calif.

[73] Assignee: Raphael Theresa Pollia, San Francisco, Calif.

[21] Appl. No.: 444,738

[22] Filed: Nov. 26, 1982

Related U.S. Application Data

[63] Continuation-in-part of Ser. No. 360,428, Mar. 22, 1982, abandoned, which is a continuation-in-part of Ser. No. 263,358, May 14, 1981, abandoned.

[51] Int. Cl.³ .............................................. F16L 17/06
[52] U.S. Cl. ..................................... 285/112; 285/351; 285/353; 285/368; 285/415
[58] Field of Search ............... 285/112, 414, 415, 412, 285/368, DIG. 18, 337, 351, 353

[56] References Cited

U.S. PATENT DOCUMENTS

| | | | |
|---|---|---|---|
| 459,907 | 9/1891 | Hogun | 285/415 X |
| 944,273 | 12/1909 | Osborne | 285/368 X |
| 1,339,636 | 5/1920 | Tulloch | 285/112 X |
| 1,683,076 | 9/1928 | Johnson et al. | 285/112 |
| 1,921,400 | 8/1933 | Weber | 285/337 X |
| 2,507,261 | 5/1950 | Mercier | 285/368 X |
| 2,531,922 | 11/1950 | Seamark | 285/353 X |
| 3,414,297 | 12/1968 | Pollia | 285/415 X |
| 3,524,662 | 8/1970 | Tolman et al. | 285/415 X |
| 3,594,023 | 7/1971 | Yamo | 285/337 |
| 3,610,666 | 10/1971 | Tyler | 285/368 X |

FOREIGN PATENT DOCUMENTS

| | | | |
|---|---|---|---|
| 654887 | 6/1963 | Italy | 285/368 |
| 260884 | 5/1964 | Netherlands | 285/368 |
| 14496 | of 1898 | United Kingdom | 285/368 |
| 737720 | 9/1955 | United Kingdom | 285/112 |
| 789919 | 1/1958 | United Kingdom | 285/412 |

*Primary Examiner*—Dave W. Arola
*Attorney, Agent, or Firm*—Flehr, Hohbach, Test, Albritton & Herbert

[57] ABSTRACT

A coupling assembly for coupling an elongated cylindrical element such as a pipe section or shaft to a second element such as another pipe section or shaft. A shallow circumferential groove is formed on an outer circumferential surface of the cylindrical element at a position spaced a moderate distance from the end at which the coupling is to be made. At least one split ring mounted in the groove and has an outer circumferential portion tapering inward from a center line toward the back of the ring. A generally hollow cylindrical housing is mounted over the split ring and has a tapered inner surface portion contacting at least a portion of the tapering outer surface of the split ring. A fastening arrangement draws the housing toward the other element to force the tapered inner surface portion of the housing into contact with at least a portion of the tapering outer surface portion of the split ring. This presses the split ring onto the cylindrical element so that the housing and the split ring tightly couple the cylindrical element to the second element. Two housings and two split rings are used to couple two cylindrical elements together. A sealing arrangement is provided within the housing in the case that a pipe section is being coupled to a flange or another pipe section to provide a fluid-tight seal at the joint.

22 Claims, 13 Drawing Figures

COUPLING SYSTEM

This application is a continuation-in-part of application Ser. No. 360,428, filed Mar. 22, 1982, which is a continuation-in-part of application Ser. No. 263,358, filed May 14, 1981 both now abandoned.

This invention relates generally to systems for coupling an elongated cylindrical element to a second element. This invention also relates to systems for forming pipe joints and pipe-flange joints in piping systems and, more particularly, to a system for forming cold joints in pipe sections and between a pipe section and a valve or pump flange.

Various approaches are taken currently to forming joints between sections of pipe in piping systems and between sections of pipe and mounting flanges on valves or pumps utilized in such systems. In piping systems which contain liquids under pressure or liquids which are corrosive, toxic, or radioactive, the provision of pipe joints which are secure and reliable over long term operation is highly important. One standard prior art system for making pipe joints is to thread or weld a flange onto the end of each pipe section to be joined and then fastening the flanges together with threaded fasteners extending through aligned bolt holes in the two flanges. The use of threaded flanges requires that each section of pipe which is not a standard length be custom cut and threaded. Forming pipe threads is an expensive and time consuming operation. Furthermore, threaded pipe flanges will not stand up to very high pressure and temperature.

The use of welded flanges of either the weld neck type or the slip-on flange type require at least one welding operation. It is well-known that pipe joint welding is a very sensitive process. Unless it is done with extreme care and skill, weld defects will occur and cause a loss of overall joint integrity. Welding is also utilized in some piping systems to directly weld the ends of successive pipe sections together. This approach is generally used in joining lengths of stainless steel pipe together in nuclear power plants. In addition to the significant probability that one of numerous types of weld defects will be created during the welding process, creation of stresses in the metal pipe at the joint is an inherent aspect of that process. Such stresses can eventually produce in-service fatigue cracking and corrosion cracking in the pipe in the vicinity of the weld. Consequently, in critical piping installation, such as in nuclear power plants, periodic time consuming and expensive inspection operations must regularly be carried out on pipe welds to assess the integrity of the pipe at the weld. If the testing operation, using ultrasonic or other non-destructive testing techniques, shows up the possibility of a weld defect or an in-service corrosion or stress cracking condition in the pipe, the power plant must be shut down while the pipe section is replaced.

In addition to the problems of weld defects which may occur either in directly welded pipe sections or in the process of welding flanges on pipe sections, the welding operation itself may create a fire hazard in certain plant environments. This may occur either during an initial piping system installation or during in-service retrofitting or reconfigurating of the pipe system. Furthermore, where welded-on flanges are provided, care has to be taken, for example by using bolt hole alignment fixtures, to insure that the bolt holes on adjoining flange sections will be in alignment. Otherwise, the flanges and the attached pipe sections have to be drifted together. This may create high stress in a joint where it would not otherwise exist.

Various approaches have been utilized in the prior art for clamping pipe sections together in a sealed fashion. One prior art pipe coupling assembly involves the use of a split clamp housing together with a cylindrical rubber gasket which fits over the pipe joint. The two halves of the clamp housing extend into a circumferential groove surrounding each end of the pipe section which assists in maintaining the clamp housing in position. The coupling relies on liquid under pressure inside the pipe to seal the rubber gasket against the pipe. The coupling will only work at liquid pressures in the range of about 300-1500 PSI since there is no longitudinal clamping force to hold the two pipe sections together such as you have with a flange joint. Furthermore, the use of a rubber gasket limits the types of fluids with which the coupling can be used.

Other types of gasket and housing assemblies have been used in the art but these generally involve a friction-type of holding and sealing which can only keep the pipe joint together against an internal pressure of ten or fifteen pounds. Any higher pressure causes the pipe sections to slide out of the housing unless they are anchored which adds to installation cost.

Various types of pipe coupling systems employing cold joints have also been disclosed in the prior art. Examples of such cold joint coupling arrangements are those described in my U.S. Pat. Nos. 2,784,990, 2,867,454, 3,085,820 and 3,414,297. Each of these pipe couplings utilizes a key and groove arrangement with keys fitting into slotted grooves near the ends of the pipe sections to hold removable flanges on the pipe sections. While such pipe couplings provide the advantages of a detachable flange coupling system, a substantial number of separate parts are required for completing the pipe coupling with appropriate sealing against fluid leakage. Moreover, all of the thrust forces which are applied between the pipe section and the flange in response to load forces tending to separate the pipe sections at the coupling are applied to a relatively small surface area where the key structure and the wall of the groove in the pipe abut each other. This high concentration of stress at such locations may cause structural damage to the key arrangement or the pipe wall under high static or dynamic shock loads applied to the pipe coupling components.

A pipe coupling for hard cast iron pipe is disclosed in Tolman et al. U.S. Pat. No. 3,524,662. The Tolman et al. coupling arrangement utilizes the combination of a split ring seated in a circular groove formed near the ends of each pipe section, bolting collars having tapered inner surfaces with a high degree of taper to strongly urge the pipe sections toward each other as the bolting collars are drawn together, and a sealing gasket positioned between the ends of the pipe sections to form a fluid tight seal thereat. The steep angle (20–30 degrees) of the tapered inner surface of the bolting collars provide a high coupling thrust load through the split rings to the ends of the pipe sections to draw them together. The steep angle minimizes the radial component of force on the split ring which might otherwise crack the brittle cast iron pipe material under shock and/or static pressure loads applied between the bolting collars and the pipe.

Because of the clamping action applied by the bolting collars through the split rings and the walls of the grooves in the pipe links to draw the pipe ends together for compressing a sealing gasket structure therebetween, several disadvantages and limitations are encountered in the Tolman et al. system. For example, only limited axial misalignment between the coupled pipe sections can be tolerated without risking leakage around the compressed gasket. The high stress concentrations between the pipe ends and the grooves due to the clamping action limits the magnitude of the clamping force which can be achieved on the gasket without risking breakage of the pipe and thus limits the pressure load which the pipe joint can withstand without leaking. Complete pressure sealing of the Tolman et al. joint system would be difficult to achieve if the surfaces of ends of the pipe sections are not cut square.

The Tolman et al. system cannot be utilized to replace or reconfigure a pipe section in an installed piping system in cases where the pipe sections to be joined together by the replacement section are fixed in position. Such pipe sections cannot be drawn toward the replacement pipe section for purposes of compressing end wall gaskets therebetween as required in the Tolman et al. system. Such replacement and reconfiguration situations are frequently encountered in piping installations having either fixed valve locations or pipe support or hanging arrangements which fix the positions of the pipe sections relative to each other.

The Tolman et al. system cannot be used in original large pipe system installations where different sections of the system are being assembled simultaneously by a plurality of pipe fitters. There is no ability with the Tolman et al. system to join the ends of various sections together.

The Tolman et al. system also requires the use of a relatively deep groove in order to have a sufficient biting surface in the groove for transmitting the clamping force required to compress the gasket between the pipe ends.

In addition, the Tolman et al. coupling system does not enable a pipe section to be coupled to a standard flange since there is no provision on the Tolman bolting collars for a thrust-bearing surface to contact a similar thrust-bearing surface on the standard pipe flange.

It is an object of this invention to provide an improved system for coupling an elongated cylindrical element to another element.

It is another object of this invention to provide an improved piping system.

It is another object of this invention to provide an improved system for forming pipe joints and pipe-flange joints.

It is another object of this invention to provide an improved pipe joining system which employs a highly reliable cold joint.

It is another object of this invention to provide an improved pipe joining system which places no substantial stresses on the pipe sections during installation.

It is a further object of this invention to provide a pipe joining system which entails no fire hazard during assembly.

It is a further object of this invention to provide a pipe joining system which can easily be installed by knowledgeable mechanics without the use of expensive capital equipment.

It is a further object of this invention to provide a pipe joining system employing components which can be easily dismantled and reused.

It is a further object of this invention to provide an improved piping system having lower installation costs from both a material and labor standpoint.

One aspect of this inventions features a coupling assembly for coupling an elongated cylindrical element to a second element having a front facing thrust-bearing surface thereon. A shallow circumferential groove is formed on an outer circumferential surface of the first element at a position spaced a moderate distance from the front end of the element at which the coupling is to be made. At least one split ring is mounted in the groove and has an outer circumferential surface portion tapering radially inward in a direction away from the front end of the first element. A housing-fastener assembly is provided and includes a generally hollow cylindrical housing mounted over the split ring and having an inner surface portion tapering radially inward in a direction away from a front surface of the housing. This tapering surface portion contacts at least a portion of the tapering outer surface of the split ring. Fastening means is provided for mounting the housing to the second element. The housing-fastener assembly further includes thrust-bearing means defining a front-facing, thrust-bearing surface which is displaced forward of the front of the first element and is clamped toward the thrust-bearing surface on the first element. This thrust-bearing surface takes the thrust force of the fastening means leaving the front end of the first section separated from the second element. The tapered inner surface portion of the housing has an angle with respect to the axis of ther first element substantially less than twenty degrees and thereby produces a strong radial squeezing force of the split ring on the first element in response to load forces tending to separate the first and second elements.

The basic coupling assembly of this invention can be utilized in two different modes. In the first mode a substantial initial radial squeezing force of the split ring on the first element is provided in absence of any load forces tending to separate the first and second elements and that radial squeezing force increases in the presence of such load forces. In the second mode the coupling assembly is made without producing any substantial initial radial squeezing force of the split ring onto the first element and substantial squeezing forces are produced only in response to load forces which tend to separate the first and second elements.

The first mode may be implemented by including in the coupling assembly a thrust ring mounted over the front of the first element and extending between the split ring and the thrust-bearing surface on the second element with a front portion thereof substantially overlapping the front end of the first element and the front surface of the housing. This thrust ring maintains a separation between the first and second elements after the coupling has been made. In this embodiment the fastening arrangement includes means for drawing the housing toward the second element and thereby compressing the thrust ring and the split ring between the thrust-bearing surface of the second element and the tapered inner surface of the housing to cause a substantial initial radial squeezing force of the split ring on the first element before any load forces are placed on the first and second elements.

The second mode is preferably implemented with a split ring which has a generally circular cross-section and utilizing a shallow groove with a rounded longitudinal cross-section substantially matching the bottom surface portion of the split ring. The tapered inner surface portion of the housing is positioned such that a region on the tapered inner surface contacts an outer surface portion of the split ring at an intermediate location between the front and rear surfaces of the housing. In this mode the housing-fastener assembly has a front thrust-bearing surface thereon at an opposing position to the thrust-bearing surface on the second element. The front thrust-bearing surface of the housing-fastener assembly overlaps the front end of the first element to maintain separation between the first and second elements as the housing-fastener assembly is being clamped to the second element. In this approach there is no force being applied between the split ring and the tapered inner surface of the housing to cause any substantial squeezing effect on the split ring and thus no substantial initial radial squeezing force of the split ring is placed on the first element.

In one version of a coupling assembly utilizing the second mode, a keeper ring means is mounted over the front end of the first element and extends between the front thrust-bearing surface of the housing-fastener assembly and a front surface of the split ring to keep the split ring in the shallow groove as the housing-fastener assembly and the second element are being clamped together. This assures that the split ring will not inadvertently be pushed out of the shallow groove as the components are being assembled.

Utilizing appropriate sealing means, the coupling assembly of this invention may be utilized to couple two cylindrical pipe sections together or to couple a single pipe section to a pump or valve flange.

In accordance with another aspect of this invention, a piping system is provided. The system includes pipe components such as T-couplings, crosses, elbows, valves and pumps and a kit of parts for providing fluid tight joints between these pipe components and straight pipe sections. Each of the pipe components has a straight free-end section with a shallow circumferential groove formed therein a short distance from the end. The kit of parts includes a plurality of split rings each adapted for mounting in one of the grooves formed on free-ends of the pipe components or in a similar groove formed on a straight pipe section. A plurality of housing-fastener assemblies is provided. Each of these assemblies includes a pair of hollow cylindrical housings adapted to be mounted over the split rings and having an inner surface portion tapering radially inward in a direction away from a front surface of said housing and adapted to contact at least a portion of the tapering outer surface portion of the split ring. A fastening means is provided for drawing a pair of respective housing together. Thrust-bearing means provide a front facing thrust-bearing surface displaced forward of the front end of a pipe component when the tapered inner surface of the housing is in contact with the split ring. In this way a separation distance is maintained between the ends of the two components being coupled together by the housing-fastener assemblies. The housing-fastener assembly further includes sealing means adapted to be mounted over adjacent ends of pipe sections or pipe components to provide a seal against leakage of fluid at the joint.

The pipe section joining system of this invention achieves a number of advantages over prior art approaches. Assembly operations do not require any electric arc or flame equipment. Thus there is no fire or explosion hazard involved in making pipe joints. No special skill is required in making the joint assembly in accordance with this invention so the pipe joining operation can be carried out easily and quickly by knowledgeable mechanics. Existing, easy to use equipment can be utilized to form the shallow groove on each pipe section. No expensive capital equipment is required for the assembly operation. Consequently, the material and labor cost involved in making a sealed pipe joint should be substantially less than the comparable costs for making joints using other techniques. Compared to flanged joint assemblies, the bolt hole diameter of the joint assembly of this invention may be made substantially less, thereby reducing the space occupied by the joint assembly. This increases the density of pipe in side by side piping installations and may result in lowered construction costs.

Another advantage of the system of this invention is that the assembly can be easily and quickly dismantled and all parts of the assembly can be reused. In situations where it is desirable to reconfigure a piping system, the system of this invention can readily be employed to introduce Y or T-joint sections or valve or pump units into the overall piping system. The joint assembly of this invention can readily be adapted to mate with a standard flange, thus providing flexibility in applying the invention in piping installations. Because the ends of the pipe sections do not come together, large piping systems can be installed with various sections being put together simultaneously and ultimately joined together at selected locations.

The pipe joint assembly of this invention further produces advantages from a reliability standpoint. The coupling thrust forces produced during joint assembly are not applied to the pipe components themselves and subsequently applied loading forces actually tighten the joint by increasing the squeezing force of the split ring on the pipe. The assembly is highly earthquake resistant since the pipe sections are free to rotate with respect to each other and the joint components and, to some degree, to flex without breaking the joint. There is no heat required in the assembly operation. Therefore, there is no tendency to create stresses in the pipe section or in the overall assembly. The assembly is readily adaptable to use in a corrosive liquid environment and low joint cost can still be achieved by utilizing stainless steel liners or stainless steel sealing rings within the housings while retaining the basic carbon steel housing structure for overall clamping strength.

This invention enables the provision of a complete, integrated piping system with pipe components such as T-couplings, crosses, elbows and valves to be specially formed to have a shallow groove machined in a flat end section thereof to accept a split ring and to be quickly mated with housing and sealing means to form a sealed joint. This type of overall system could provide a lower cost alternative to pipe systems which use flanged components.

Other objects, features, and advantages of this invention will be apparent from a consideration of the detailed description given below in conjunction with the accompanying drawings.

As described above, the coupling assemblies of this invention may be broadly categorized as having two separate structural-operational coupling modes. Each of the coupling systems employs a tapered inner surface on a housing cooperating with a split ring to produce strong radial squeezing forces of the split ring on the pipe section or other cylindrical element in response to a load force which tends to separate that element from another element to which it has been coupled. Each of the two modes also involves structural arrangements in which the thrust of the coupling forces applied to the components in the coupling are taken by the housing and other associated components of the coupling assembly and are not applied to the pipe sections themselves.

In one of the structural-operational modes at least a portion of the coupling thrust forces are applied to the split ring to produce an initial squeezing of the split ring onto the cylindrical element. This mode is employed in the embodiments shown in FIGS. 1-4, FIG. 8, and FIGS. 12 and 13.

In the second mode, the thrust forces of the coupling are not applied to the split ring and the only initial squeezing force which is applied through the split ring to the pipe section is a small one which may be created by seating the split ring in the tapered surface portion of the housing. Embodiments utilizing this mode are the ones shown in FIGS. 5-7 and FIGS. 10 and 11.

Figure 1:
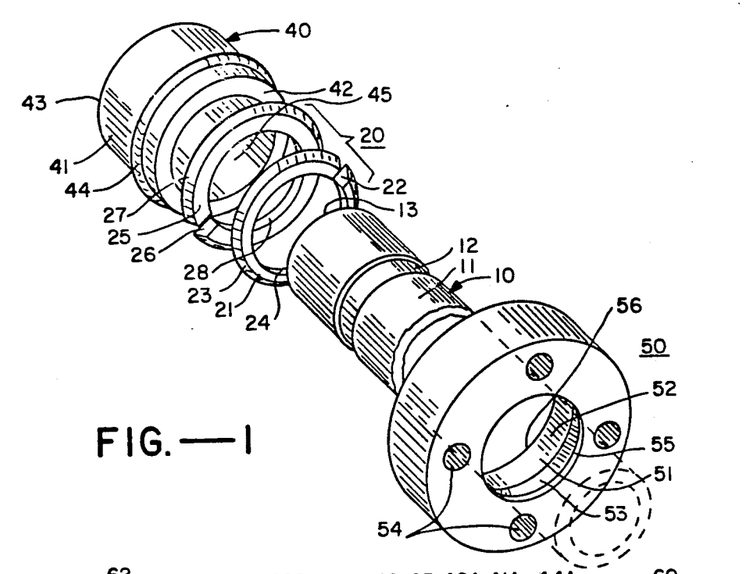
FIG. 1 is an exploded isometric view of the major components of one embodiment of a system for forming pipe joints in accordance with this invention.
Figure 2:
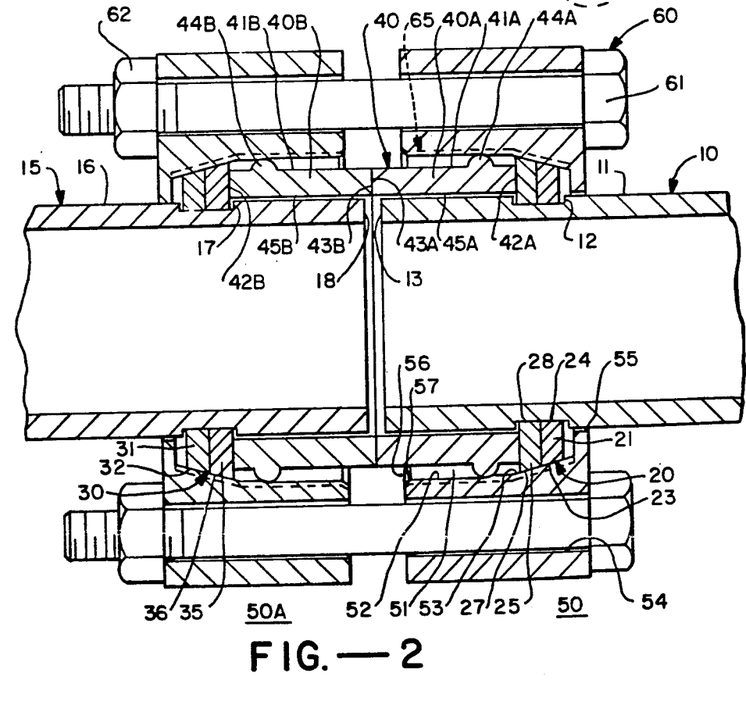
FIG. 2 is a sectioned elevation view illustrating one embodiment of a pipe joint assembly in accordance with this invention.
Figure 4:
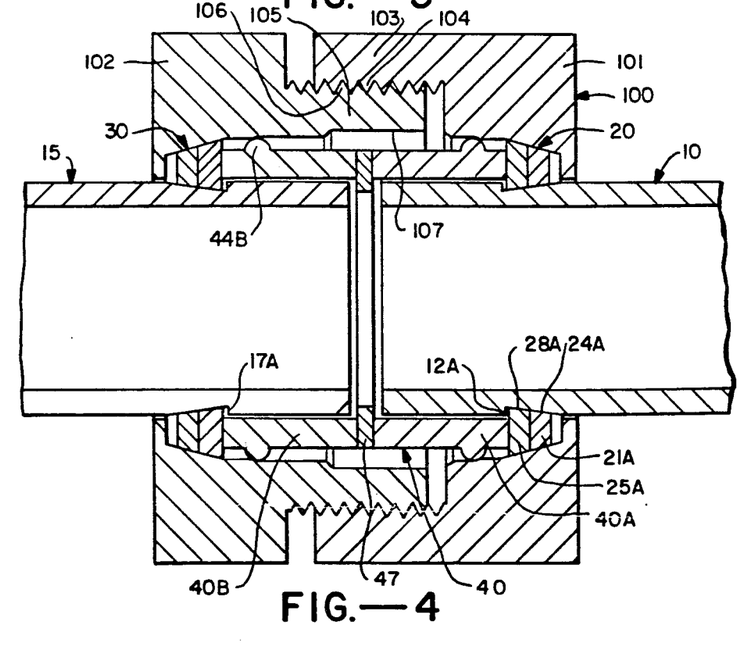
FIG. 4 is a sectioned elevational view of an alternative embodiment of a pipe joint assembly in accordance with this invention.

Referring now to FIGS. 1 and 2, the major components of a one embodiment of a system for forming pipe joints in accordance with this invention will be described. FIG. 1 shows the components of a pipe joint system prior to assembly and FIG. 2 shows a completed pipe joint assembly. As shown in FIG. 2, the purpose of this embodiment is to join two sections of pipe 10 and 15 together in a manner which forms a high pressure fluid tight seal. The pipe sections 10 and 15 have shallow grooves 12, 17 formed on outer circumferential surfaces 11, 16. The grooves 12, 17 are formed a moderate distance from the adjoining ends 13, 18 of the pipe sections 10, 15. The grooves 12 and 17 have bottom surfaces parallel to the pipe wall. Alternatively, as illustrated in FIG. 4, the grooves 12A and 17A have bottom surfaces tapered upwardly away from the pipe end.

A pair of split rings 20, 30 is mounted in each of the grooves 12, 17. The split ring pair 20 includes a first split ring 21 having a split section 22 formed therein and a second split ring 25 having a split section 26 formed therein. The overall structure of the split rings 21 and 25 is best seen in FIG. 1. Split rings 31 and 35 mounted in the groove 17 of pipe section 15 have an identical structure to split rings 21 and 25 but are mounted in a reverse orientation in the groove 17. Split ring 21 has an outer circumferential surface 23 which is tapered inwardly in a direction away from the end 13 of the pipe section 10 on which it is mounted. Similarly, split ring 25 has an outer circumferential surface 27 which is tapered inwardly in the same direction. The tapered surface 23 of split ring 21 and the tapered surface 27 of split ring 25 together form a uniformly tapered wedge surface.

The inner circumferential surfaces 24 and 28 of split rings 21 and 25 match the configuration of the pipe groove 12. If the pipe groove is tapered as shown in FIG. 4 (i.e. groove 12A), the inner circumferential surfaces 24A and 28A of the split rings 21A and 25A are tapered to match. This double taper creates a double wedge surface which increases the mechanical advantage of the squeezing action of the split rings on the pipe. Using a tapered groove on the pipe has the further advantage in thin wall pipe systems that the volume of material removed from the pipe wall is reduced, lessening the weakening of the pipe wall at that location. A thrust ring means 40 is mounted over the adjoining pipe ends with opposite end walls 42A and 42B abutting the surfaces of the inner split rings 25 and 35. As shown in FIG. 2, the thrust ring means 40 consists of a pair of separate thrust rings 40A and 40B each having identical configurations but mounted in opposite senses over the adjoining ends of the pipe sections 10 and 15. It will be appreciated, however, that the thrust ring means 40 could be formed as one integral thrust ring which would span the adjoining ends of both pipe sections 10 and 15. Using the two separate thrust rings approach depicted in FIG. 2, a metal-to-metal joint seal may be formed as shown between the abutting walls 43A and 43B of the two thrust rings 40A and 40B. Alternatively, as depicted in FIG. 4, a gasket 47 may be positioned between the thrust rings 40A and 40B to form the fluid tight seal therebetween. The remainder of the fluid tight seal provided by the thrust ring is accomplished by the integral sealing rings 44A and 44B projecting from the outer circumferential surfaces 41A and 41B of the split ring sections 40A and 40B. As will later be described in more detail, the outer diameter of these integral sealing rings 44A and 44B is formed to be slightly larger than the internal diameter of the cylindrical cavity section 52 formed in housing 50. The inner surface 45A of the thrust ring 40A is formed with an inner diameter slightly larger than the outer diameter of the pipe section for an easy slip fit therebetween.

Housing 50 comprises a generally cylindrical body having a central cavity 51. Back opening 55 in cavity 51 is sized for as easy flip fit over the external surface 11 of pipe section 10. The front opening 56 of cavity 51 is formed with an inner diameter just slightly smaller than the outer diameter of the sealing ring 44A on thrust ring 40A. A taper 57 may be formed at the front wall of the cavity 51 in order to ease the overthrust of the housing 50 onto the sealing ring 44A. The cavity 51 of housing 50 has a tapered wall surface 53 toward the back end of the cavity which is formed to match with substantial precision the angle of the wedge surface (23 plus 27) of the split ring pair 21 and 25. However, the length of tapered surface 53 is greater than the combined length of surfaces 23 and 27 to allow for pipe diameter and split ring diameter tolerances. Housing 50 further has a series of fastener receiving holes 54 through which threaded fasteners such as bolt and nut combination 60 may be extended to draw together the housing 50 and its companion housing 50A as the joint assembly is put together. (The second housing 50A depicted in FIG. 2 is identical in configuration to the housing 50 so a separate description and reference numbering will not be utilized in connection with the second housing.)

Consider now the assembly operation of the components depicted in FIGS. 1 and 2. First the shallow grooves 12 and 17 are formed in the pipe sections 10 and 15 utilizing a groove-forming tool such as the "Vic-Groover" available from Victaulic Company of America, 835 Lehigh Ave., Union, N.J. 07083. Similar grooving tools are available from other sources. If tapered grooves, such as grooves 12A and 17A in FIG. 4 are to be formed, the cutting knives of the grooving tool are shaped accordingly. Thereafter, the housings 50 and 50A are slipped over the pipe sections 10 and 15 and pushed sufficiently back on the pipe sections to be out of the way of the remainder of the initial assembly operation. The next step is to mount the split ring pairs 20 and 21 into the grooves 12 and 17 of pipe sections 10 and 15. Each of the split rings is held in a slightly open condition and then slipped over the ends of the associated pipe section until it rests in the proper position within the associated groove. When released the split ring springs back into the groove and is retained there. The split ring pairs are mounted with respective split sections 22 and 26 at different radial locations. Once both pairs of split rings are assembled onto and positioned on the pipe sections, the thrust ring means 40 is mounted over the adjoining pipe sections. Then the housings 50 and 50A are brought toward each other and the fastening and the mounting bolt assemblies 60 are inserted in the bolt holes 54 in the housing 50 and 50A. Note that there are no mounting hole alignment difficulties since the housings are free to rotate on the pipe.

Fastening means 60, such as the bolt 61 and nut 62, are then utilized to draw the two housings 50 and 50A toward each other with each fastener being tightened a little bit at a time to maintain the housings substantially parallel to each other. As the housing 50 and 50A are drawn together the sealing rings 44A and 44B enter the respective cavities in the housing in a press fit sealing engagement with the inner walls thereof. The housings 50 and 50A are gradually drawn together until the tapered surfaces thereon encounter the wedge surfaces on the split rings. Further tightening of the fastening means 60 applies pressure on the split ring assemblies 20 and 35. The vertical component of the pressure squeezes the split rings tightly onto the circumferential surface of the pipe grooves in which they are mounted. The horizontal component of the pressure squeezes the split rings together and, furthermore, squeezes the split rings against the individual thrust rings and squeezes the thrust rings together.

Sufficient pressure is applied via the fastening assembly 60 to tightly clamp the bottom surfaces 24 and 28 of the split ring pair 20 into the groove 12 forming a metal-to-metal seal which together with the metal-to-metal seal between abutting vertical surfaces on the split rings themselves prevents any fluid leakage past the split ring assembly toward the back of the housing 50. The same action occurs simultaneously on the split ring pair 30. As the two thrust ring sections 40A and 40B are squeezed together, their smoothly machined end walls 43A and 43B form a fluid tight metal-to-metal joint. The fluid which can traverse the narrow channel between the split ring means 40 and the outer surfaces 11 and 16 of the pipe sections 10 and 15 does not escape the joint assembly due to the sealing press fit between the sealing rings 44A and 44B and adjacent inner wall section 52 of the housing 50. It will be appreciated that because the inner split ring 25 has a split section, the fluid from the pipe can penetrate to the region between the sealing ring 44A and the split ring 25 but can go no further.

It will be appreciated that the dimensions of the components for forming a pipe joint assembly in accordance with this invention will vary with the size and type of pipe on which the joint is to be made. The grooves 12 and 17 in the pipe sections 10 and 15 need be formed to a depth of only about one-sixteenth of an inch which is about seventy percent of the normal depth of a thread cut on a threaded pipe section. The groove does not need to be any deeper because of the squeezing or clamping action of the split rings caused by the transverse component of the force applied to the split rings by the housings as they are drawn together.

The total width of the groove in the pipe section is preferably slightly greater than the combined width of the pair of split rings to permit at least a small amount of shifting of the pipe section with respect to the split rings. The length of the individual thrust rings 40A and 40B is made slightly greater than the distance between the inner edge of the groove in the pipe section and the end wall of the pipe section in order that the sealing end walls 43A and 43B will overlap the pipe end walls and take all of the thrust of the sealing assembly. Correspondingly, if a single thrust ring means is employed the total length would be somewhat greater than twice the distance between the inner edges of the grooves and the end of the pipe to provide the separation between the adjoining ends of the two pipe sections.

All of the surfaces of the various components which form part of a metal-to-metal fluid seal are machined or otherwise formed to a sufficient degree of flatness to adequately form the seal. The angle of the wedge surface formed by the tapered circumferential surfaces of the split rings and the corresponding tapered inner surface of the housing is not critical but should be substantially less than twenty degrees to provide strong squeezing forces on the split rings. Angles between about five degrees and fifteen degrees are preferred to achieve such a strong squeezing effect.

As depicted in FIG. 2, the combination of forming the groove in the pipe slightly wider than the total thickness of the split rings, forming the inner diameter of the thrust ring slightly greater than the outer diameter of the pipe section and maintaining a small amount of clearance between the end walls of the adjoining pipe sections in the joint all contribute to an overall joint assembly which will not blow apart even if the pipe sections are subjected to a substantial amount of twisting or flexure which may be caused by earthquakes, or sudden changes in pressure or temperature within the pipes. This adds greatly to the overall reliability of the joint in comparison to rigid joint structures formed by welding and other techniques. It will be further appreciated that the assembly is highly tolerant to tolerance variations in the sizes of the pipe sections since the tapered surface 53 on the housing 50 is formed with a greater length than the wedge surface on the split rings. Accordingly, if the pipe is undersized, the housings will draw closer together and the wedge surface of the split rings will end up closer to the back wall of the housing. Similarly, if the pipe is oversized, the housings will not draw as close together and the split rings will end up positioned closer to the front wall of the housing.

The materials from which the various pipe joint components are formed will depend on the application. For non-corrosive fluids, the pipe section would generally be made out of an alloy steel. The split rings could be formed either by machining them out of an alloy steel or precision casting them. The thrust ring would normally be formed by machining an alloy steel pipe section. The housing would typically be formed from a forged high strength carbon steel plate with the inner surfaces of the central cavity machined to the appropriate shape and the bolt holes drilled at relatively precise locations. On the other hand, if the joint assembly were to be used with a highly corrosive fluid, stainless steel piping would normally be used and the split rings and thrust rings would be formed from some type of stainless steel alloy. While the housing could also be formed of a stainless steel alloy to avoid corrosion of surfaces thereof which come in contact with the corrosive liquid, it would be preferable (for low cost and joint strength) to use a carbon steel housing. To permit use of such a housing material in a highly corrosive environment, a thin stainless steel liner 65 could be inserted in the cavity 51 as shown in dashed lines in FIG. 2. The stainless steel liner 65 is thus the only part of the housing which would come into contact with the corrosive fluid and the metal-to-metal seal would be formed between all stainless steel component surfaces.

Figure 3:
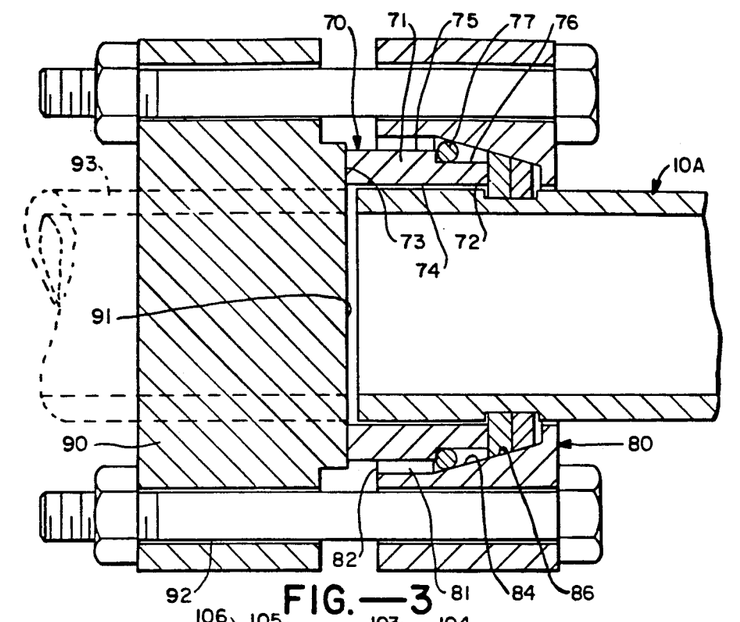
FIG. 3 is a sectioned elevational view of one embodiment of a pipe section/flange joint assembly in accordance with this invention.

FIG. 3 illustrates how the pipe joint components of this invention may be employed to form a joint between a pipe section 10A and an existing flange 90. FIG. 3 also illustrates how a blind wall may be formed at the end of a pipe section utilizing the joint components of this invention. Generally the joint components illustrated in FIG. 3 are the same as those depicted in FIGS. 1 and 2 except that the thrust ring means 70 has been modified to carry a metal O-ring 77 thereon and corresponding modifications have been made in the outer surface configuration of the thrust ring 70 and the inner surface configuration of the cavity 83 in the housing 80.

As shown in FIG. 3, the thrust ring means 70 has a circumferential front surface section 76 of a reduced diameter from the circumferential back surface 75. The circumferential front surface 76 carries a metal O-ring 77 with the step between the two surfaces preventing the O-ring 77 from sliding toward the front of the thrust ring. The cavity 81 in housing 80 is formed with an inwardly tapering wall section 84 located at a position such that a press fit against the metal O-ring 77 will be formed as the housing 80 is drawn up to the flange 90. It will be appreciated that this same thrust ring and the O-ring assembly could be utilized in the joint assembly depicted in FIG. 2. The front aperture 82 in the housing is sized to enable the housing to slip easily over the O-ring 77 until the O-ring encounters the tapered inner surface 84 on the housing.

The bolt circle diameter of the housing 80 must be matched to the bolt circle diameter of the flange 90. Generally, where two housings such as housings 50 and 50A depicted in FIG. 2 are used to form a pipe joint, the bolt circle diameter will be substantially less than a corresponding bolt circle diameter on a flanged type of joint assembly. Accordingly, to make the pipe section-flange joint shown in FIG. 3, the bolt hole diameter of the housing 80 would be made larger in order to match the housing to the flange 90. As shown in FIG. 3, the end wall 73 of thrust ring means 70 forms a metal-to-metal seal with a front facing surface 91 on flange 90. Flange 90 may either be a flange on an existing pipe section 90 (shown dashed) or a flange on a valve or pump incorporated into the piping system.

FIG. 3 is also illustrative of an assembly involving a blind end wall joint formed on a pipe section. In such a case a solid block 90 may be utilized with the joint formed between a facing surface 91 on the solid end block.

FIG. 4 illustrates an alternative approach to providing fastening means for pulling together the two housings in a pipe joint assembly in accordance with this invention. In this case the housings 101 and 102 form an overall housing assembly 100 and corresponding threaded portions 104 and 106 of mating female and male end sections 103 and 105 on the respective housings provides the fastening means for drawing the housings 101 and 102 together. FIG. 4 also shows the alternative of utilizing a gasket 47 as part of the thrust ring means 40. The inner diameter of the cavity in the housing 102 may be enlarged in the front surface portion 107 thereof in order to make it easier for the male front section 105 thereon to be slipped over the projecting sealing ring 44B on the thrust ring 40B. It will be appreciated that a single thrust ring means (as previously described) could be employed in this embodiment or the combined thrust ring and separate O-ring as shown in FIG. 3 could be utilized.

Figure 5:
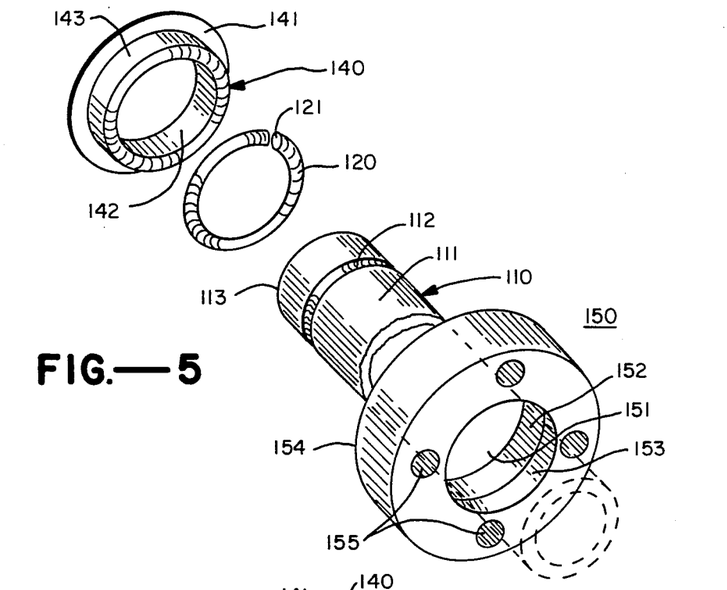
FIG. 5 is an exploded isometric view of the major components of an alternative embodiment of a system for forming pipe joints in accordance with this invention.
Figure 6:
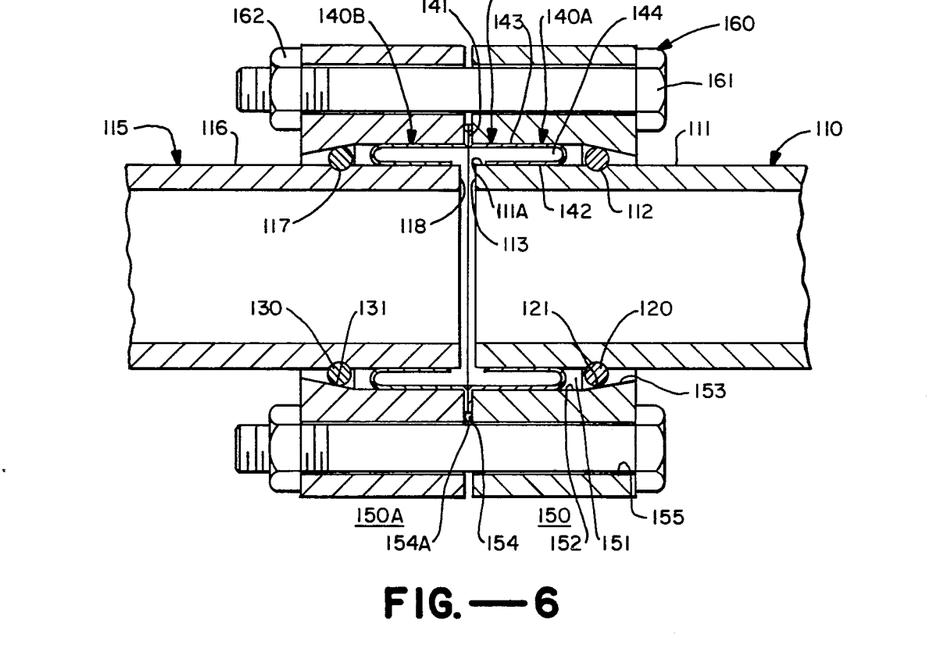
FIG. 6 is a sectioned elevational view illustrating an alternative embodiment of a pipe joint assembly in accordance with this invention.
Figures 8, 9:
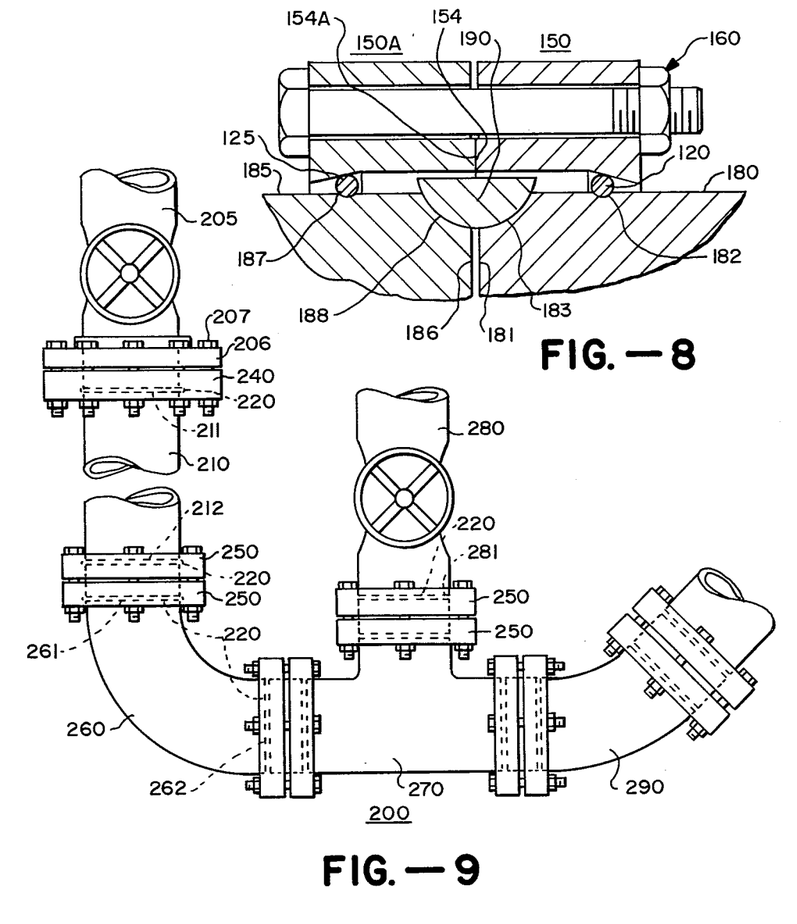
FIG. 8 is a partial sectioned elevational view of an embodiment of a cylindrical shaft joining assembly in accordance with this invention.
FIG. 9 is a plan view of a piping system in accordance with this invention.

Referring now to FIGS. 5 and 6, the major components of a presently preferred embodiment for forming pipe joints in accordance with this invention will be described. It should be understood that although the preferred embodiment will be described in connection with a joining of two pipe sections together, the preferred embodiment is generally applicable to coupling an elongated cylindrical element to a second element such as, for example, the coupling of two solid shafts together as shown in FIG. 8. It should also be understood that the presently preferred embodiment could be utilized to join a pipe section to a flanged pipe section or other flanged pipe component as depicted in FIG. 9.

FIG. 1 shows the components of a pipe joint system in accordance with this invention prior to assembly. FIG. 1 shows only one-half of the components of a completed pipe joint assembly as shown in FIG. 2. The purpose of this embodiment of a pipe joint system is to join two sections of pipe 110 and 115 together in a manner which forms a high pressure, fluid tight seal. The pipe sections 110 and 115 have shallow grooves 112 and 117 formed on their outer circumferential surfaces 111, 116. These grooves are formed a moderate distance from the adjoining ends 113, 118 of the pipe sections. The grooves 112, 117 are shallow and have a cross sectional configuration in the form of a section of a circle. A single split ring 120, 130 is mounted in each of the grooves 112, 117. Each of the split rings 120, 130 has a split section (e.g. 121 for ring 120 shown in FIG. 5). The radius of the arcuate circular grooves 112, 117 substantially matches the radius of the split rings 120, 130. Because of the circular cross section of each of the split rings 120, 130, each has a circumferential surface section 121 which tapers inwardly from the center line of the ring toward the back of the ring.

A sealing ring means 140 is mounted over the adjoining pipe ends to provide a fluid tight seal at the joint between the two pipe sections 110, 115. In this embodiment, the sealing means 140 is in the form of a pair of generally U-shaped sealing rings 140A, 140B, each of which is disposed over an associated one of the adjoining ends 113, 118 of the pipe sections 110, 115. Since the two sealing rings 140A, 140B are identical in configuration, only one need be described. Sealing ring 140A includes a flange 141 which extends radially outwardly from the outer surface 143 of the ring. The inner surface 142 of the ring is formed to a shorter length than the outer surface 143 to assure that fluid from the interior of the pipe sections 110 and 115 will enter the interior 144 of the ring. The inner diameter of the sealing ring 140A corresponds substantially to the outer diameter of the pipe sections. The outer diameter of sealing ring 140A corresponds substantially to the diameter of the cavity 151 within housing 150. As will be described in more detail later, the flange 141 cooperates with an associated flange on the sealing ring 140B to provide a metal-to-metal fluid tight seal therebetween when the front faces 154 and 154A of the housings 150 and 150A are drawn together during assembly of the joint forming system.

The housing 150 is identical to the housing 150A and only one of the two need be described in detail. Housing 150A is a generally cylindrical housing having an internal cylindrical cavity 151. The cylindrical inner wall section 152 of the cavity 151 as a uniform radius and is thus disposed generally parallel to the external surface 111 of the pipe section 110. The wall section 153 has a decreasing radius from front to back forming a slightly tapered wedge surface. The starting radius of the tapered wedge 153 is slightly greater than the outer radius of the split ring 120. The ending radius of the tapered surface 153 is slightly less than the outer radius of split ring 120. In this fashion the circularly tapering surface 121 of split ring 120 will contact the tapered surface 153 of housing 150 in the manner shown in FIG. 6. Housing 150 has a plurality of apertures 155 therethrough for receiving threaded fasteners such as the threaded fastener assembly 160 comprising a bolt 161 and a nut 162.

The assembly of the pipe joining and sealing components depicted in FIGS. 1 and 2 will now be described. First the shallow of grooves 112 and 117 are formed in the pipe sections 110 and 115 utilizing a groove forming tool such as the "Vic-Groover" available from Victaulic Company of America, 835 Lehigh Ave., Union, N.J. 07083. Similar grooving tools are available from other sources. A grooving tool having an arcuate cutting surface will be utilized to form the arcuate grooves 112 and 117 to a prearranged depth. Thereafter, the housings 150 and 158 are slipped over the pipe sections 110, 115 and pushed sufficiently back on the pipe sections to be out of the way during the remainder of the initial assembly operation.

The next step is to mount the split rings 120 and 130 into the grooves 112 and 117. Each of the split rings is held in a slightly opened condition utilizing a ring spreader and then slipped over the ends of the associated pipe section until it rests in the proper position within its associated groove. When released the split ring springs into the groove and is retained therein. With the split rings mounted, the sealing rings 140A and 140B are each slipped over their respective pipe sections. The housings 150 and 150A are then brought toward each other and the threaded fasteners 160 inserted in the mounted apertures 155. No alignment difficulties are encountered since the housings are free to rotate on the pipe sections.

The nuts 162 on the threaded fastener 160 are then gradually and uniformly tightened to draw the housings 150 and 150A toward each other until their front thrust-bearing faces 154, 154A begin to squeeze together the flanges 141 on the sealing rings 140A, 140B. While drawing the housings together, a modest pulling force is preferably applied to the pipe sections to assure that the split rings remain seated in their respective grooves. However, since no clamping thrust forces are applied to the split rings 120, 130 no substantial squeezing forces are applied to the pipe sections during assembly. However, in some cases in which a repair or replacement joint is being made there may be substantial initial squeezing forces produced. If the pipe sections to be rejoined are fixed in position (i.e. they can't move toward each other) and the length of replacement pipe is cut a little short, the tapered inner surfaces of the housings may be drawn over the split rings during the joining operation. This will produce an initial squeezing force on the split rings. However, the short pipe length will be usable (if it isn't too short) since it is not necessary that the pipe ends clamp together.

This completes the sealed pipe joint assembly operation. The pipe sections are now ready to be pressurized with fluid. The pressurized fluid enters the interior 144 of the sealing rings 140A, 140B and exerts pressure against the bottom wall sections 142 of the sealing rings. The combination of this internal pressure and the length of the wall section 142 provides a good fluid tight seal. Preferably the surface 111A of the pipe section 110 and the corresponding surface on the pipe section 115 is buffed prior to assembly so that a relatively smooth surface is provided for in contacting with the sealing surface of the inner wall 142 of sealing ring 140A. It is also preferable that the sealing ring 140A be initially formed to have a slight spreading between the outer wall 143 and inner wall 142 so that some initial spring pressure of the inner wall 142 against the wall surface 111A will be produced as the ring 140A is mounted over the pipe section 110. Because of the relatively large sealing area provided between the inner surface 142 of the sealing ring 140A and the outer surface 111A of the pipe section 111, a good metal-to-metal seal is provided, assisted by internal fluid pressure within the interior 144 to prevent any escape of fluid at the metal-to-metal interface. This seal will be maintained despite any roughness of the surface of the end section 111A of the pipe section 111 since the relatively soft inner wall 142 of the sealing ring 140 will tend to conform to the surface of the pipe.

As pointed out above, when the pipe sections 110 and 115 are initially coupled together, no substantial squeezing force is placed on the split rings 120, 130, except for a small squeezing force which may be supplied in order to keep the split rings seated in their respective grooves. After the pipe sections have been pressurized, the internal pressure within the pipe sections will tend to force the pipe sections apart. It is at this point that the squeezing affect of the tapered surface 153 of the housing on the split ring begins to take affect, causing a squeezing force to be applied by the split ring onto the walls of the pipe section. In other words, movement of the pipe section away from the housing produces a strong, mostly radially inward force to be applied to the split rings. The amount of that force is dependent on the load force which is tending to move the pipe section out of the housing. The grip of the housing on the pipe section increases with increasing load forces so that the grip of the housing on the pipe section due to the squeezing effect increases to assure that the pipe section will be retained in place within the housing and the integrity of the coupling will be maintained.

It will be appreciated that the dimensions and materials of the components forming a pipe joint assembly in accordance with this invention will vary with the size and type of pipe on which the joint is to be made and the fluid to be carried through the piping system with which the joint is associated. For illustrative purposes, a specific example of dimensions and material will be discussed. For joining two pipe sections together each having an outer diameter of four and one-half inches arcuate grooves 112 and 117 are preferably formed to a depth of about one-sixteenth of an inch. Split rings 120 and 130 may be formed from #2 gauge spring steel having a diameter of about 0.26 inches. These split rings may be cut from a coiled spring of appropriate diameter or formed in any other conventional fashion. The grooves 112 and 117 may conveniently be cut about three-quarters of an inch from the ends 113 and 118 of the pipe sections. Depending on the application, the sealing rings 140A may be formed in a die forming operation from stainless steel or soft copper, for example, starting with a sheet material, having a thickness of about one sixty-fourth of an inch. The flange 141 may be formed to a height of about one-quarter inch.

The housing 150 is preferably formed from a high strength carbon steel. The outer diameter of the housing may vary between eight and nine inches, with nine inches being the standard outer flange diameter for use on a pipe of this size. Because of the manner in which the housing grips the pipe, it may be possible to reduce the overall diameter of the housing below that of the standard flange and thus reduce the overall material cost of the housing. The thickness of the housing may vary from about one and one-half to two inches.

The angle of the tapered inner surface 153 is not believed critical, but for maximizing the squeezing force, it is desirable to have the angle substantially below twenty degrees. In practice, the degree of taper should be set with respect to the load force expected on the pipe components and the length of the tapered surface so that there is a sufficient difference in internal cavity diameter to assure that the split ring will not dig through the tapered surface and allow the pipe surface and split ring to slide out of the housing. An angle in the range between about five degrees and about fifteen degrees is preferable. By keeping the angle substantially below twenty degrees, the force on the split ring is mainly a radial inward force in response to loads tending to separate the pipe sections and housing components.

It should be understood that this invention can be employed in any metal pipe joining application. For example, it could be employed on tubing with one-eighth inch wall thickness by utilizing a groove depth of only 0.04 inches. The structural characteristics of the sealed pipe joint assembly depicted in FIG. 6, including the clearance distance between the end walls of the adjoining pipe sections and the clamping action of the housing on the split rings, contributes to an overall joint assembly which will not blow apart even if the pipe sections are subjected to a substantial amount of twisting or flexure which may be caused by earthquakes or sudden changes in pressure or temperature within the pipes. This adds greatly to the overall reliability of the joint in comparison to rigid joint structures formed by welding or bolting together of flanged pipe.

It should be further appreciated that the pipe joint assembly of this invention is highly tolerant to tolerance variations in the sizes of the pipe sections. This is due to the width of the tapered surface 153 of the housing which automatically adjusts for the overall diameter of the pipe and split ring assembly.

It should also be appreciated that the integrity of the joint is substantially improved in that, as the pipe sections are pressurized and the adjoining ends tend to pull apart, the clamping force on the split rings is increased and the overall holding power of the joint is correspondingly increased. This same increase in joint holding power is produced in response to any mechanical forces which tend to pull the pipe sections apart such as where any tension loading of horizontally or vertically disposed pipe sections is encountered. The higher the pressure of the internal fluid within the pipe section the greater the sealing force that is put on the internal wall surface 142 of the sealing rings. A prototype of the invention has, for example, been tested with liquid at sixty degrees centigrade, pressurized to three thousand pounds per square inch without showing any signs of leakage.

It should be appreciated that the embodiment of this invention depicted in FIGS. 5 and 6 can be utilized to join a pipe section to a flanged pipe section or other flanged component in a manner similar to that depicted in FIG. 3 with respect to the previously described embodiment. In this case the flange 140 on the sealing ring 140A will abut the front-facing surface of the flange and be compressed between that surface and the front-facing surface 154 of the housing 150 to provide a metal-to-metal seal thereat.

Figure 7:
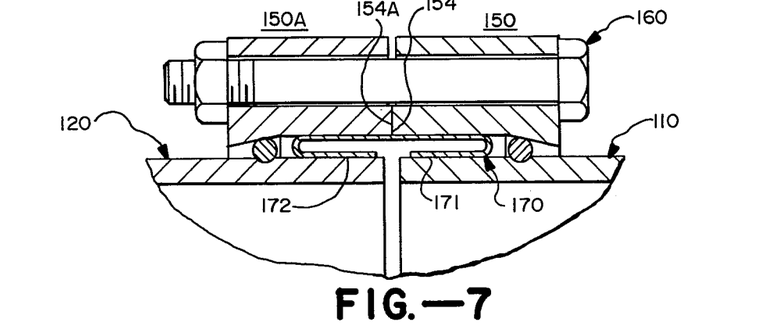
FIG. 7 is a sectioned elevational view of a portion of another alternative embodiment of a pipe joint assembly in accordance with this invention.

FIG. 7 illustrates an alternative embodiment of the invention using a sealing ring 170 having a C-shaped cross section and comprising a single sealing ring overlaping both of the end sections of the pipe sections 110 and 120. In this embodiment the sealing is provided by the surfaces of the inner wall sections 171 and 172 of the C-shaped sealing ring. In all other respects the joint assembly of the embodiment shown in FIG. 7 is identical to that shown in FIG. 6.

FIG. 8 illustrates that the general principles of the coupling assembly of this invention may be employed to couple a pair of solid shafts 180 and 185 together. This illustrates that the coupling assembly of this invention may be generally utilized to couple any elongated cylindrical element to a second element, which may be another shaft or any other element which the housing 150 may be drawn up against using an appropriate fastening arrangement. In the particular embodiment shown in FIG. 8, the respective ends 181 and 186 of the two shafts 180 and 185 remain separated as the housings 150 and 150A are drawn together by the fasteners 160 until the front thrust-bearing surfaces 154, 154A are brought together. Keyways 183 and 188 are cut into the shafts 180 and 185 to receive a semicircular key 190 which assists in preventing relative rotational motion between the two shafts but permits some relative axial misalignment between the two shafts. Such a coupling arrangement could be employed in any system where a rotational drive coupling between two shafts is required. The coupling assembly of this invention is particular useful in applications in which forces are exerted on the two shafts which tend to pull them apart such as in applications where the coupled shafts are vertically disposed and carry substantial weight. The squeezing effect of the housings 150 and 150A on the split rings 120, 125 causes an increase in the holding power of the coupling as the force tending to pull the shafts apart increases. In other words, as the shafts tend to separate, the holding power of the coupling is enhanced.

It should be appreciated that the housing embodiments shown in FIGS. 6–8, utilizing threaded fasteners to draw the two housings together, could be replaced by the arrangement depicted in FIG. 4 involving the use of male and female threads on respective housings to enable them to be drawn together. The housing and fastener arrangement shown in FIGS. 6–8 is generally preferred since the two housings can be formed identically and the manufacturer of two different housing structures is avoided.

FIG. 9 illustrates the use of the pipe joining embodiments of this invention in an overall piping system. The particular piping system depicted in FIG. 9 utilizes the coupling and sealing assembly of the type depicted in FIG. 6, but it should be understood that the embodiment shown in FIGS. 1–3 could also be utilized in the overall piping system. FIG. 9 illustrates that the pipe joining system of this invention may be adapted to joining a pipe section 210 to a piping system component such as valve arrangement 205 where the valve arrangement 205 has a standard size flange 206 thereon. In this case, the housing 240 is formed to a diameter matching that of the flange 206 and has a mounting hole pattern matching that of the flange 206.

FIG. 9 also illustrates that the various components of the piping system such as elbows 260 and 290 and T coupler 270 are advantageously formed with sufficiently long straight end wall sections (e.g. extended tangents on elbows) such that the shallow grooves required for use of this invention can be formed at the factory which manufactures the respective components. This reduces the amount of labor required for assemblying the components in the field. Accordingly, it should be appreciated that, for best advantage, the pipe joining system of this invention will be provided as an overall kit of parts including piping system components which are already fashioned to be readily integrated with the other parts of the kit to form sealed joints in accordance with the principles of this invention. The kit may, for example, include a plurality of housings such as housing 240 adapted to enable joints to be made with standard flanges such as 206. The system may also include special unflanged valve and pump components such as valve component 280 which has end pipe sections adapted to be joined with other pipe components or pipe sections utilizing fully the principles of this invention.

Figure 10:
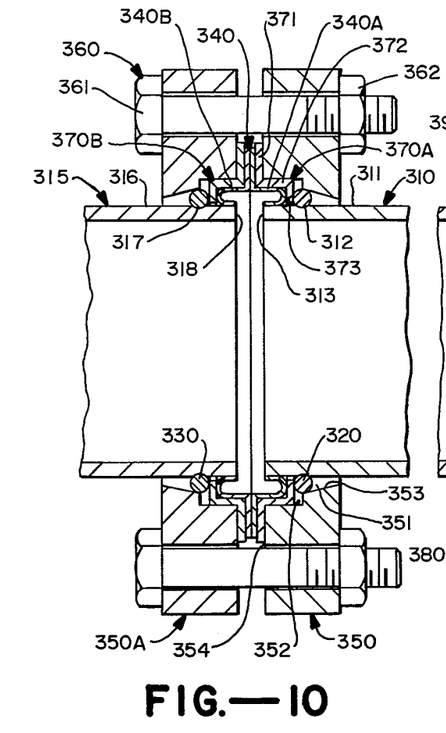
FIG. 10 is a sectioned elevational view illustrating an alternative embodiment of a pipe joint assembly system in accordance with this invention.

FIG. 10 illustrates a presently preferred embodiment of a coupling system in accordance with this invention for coupling together two pipe sections 310 and 315 in an overall sealed joint arrangement. The coupling system arrangement shown in FIG. 10 is similar to the one shown in FIG. 6 except that keeper ring elements 370A and 370B are provided to insure that the split rings 320 and 330 will be retained in their respective grooves 312 and 317 as the components of the coupling system are assembled. The keeper ring 370A has a main body portion 372 which fits within an enlarged front cavity region 352 in the housing 350. A flange portion 371 extends radially outward from the front end of the main body portion 372. When the keeper ring 370A is fully inserted in the front cavity portion 352 the back surface of the flange portion 371 abuts the front surface 354 of the housing 350.

At the back of the main body portion 372 of the keeper ring 370A, a flange 373 extending radially inwardly is provided. When the keeper ring 370A is fully inserted the back surface of flange 373 preferably abuts the front surface of the split ring 320. However, the split ring keeping function will be performed even if a small gap is present between the flange and the split ring.

Keeper ring 370A permits the seated position of the split ring 320 in the tapered inner surface 353 of the housing 350 to be maintained at a point where the center line of the split ring is positioned at about the start of the tapered inner surface. Once the housing 350 has been brought over the split ring 320 and the keeper ring 370A, the positional relationship between the back flange 373 of the keeper ring and the start of the tapered inner surface 353 is such that the split ring 320 is constrained to be seated within the groove 312. It should be noted, however, that as the housings 350 and 350A are drawn together by the fastening arrangement 360, the coupling thrust which is imparted through the front flange portion 340A of the keeper rings to the corresponding flange portions on the sealing rings 340A and 340B is not transmitted to the split rings 320 and 330. In this manner, only at most a small squeezing force is applied by the tapered inner wall of the housing 350 on the split ring 320 at the initial installation of the sealed joint using this embodiment of a pipe coupling system.

Substantial squeezing force is applied by the tapered inner surface 353 to the split ring 320 only under load forces which tend to separate the pipe sections 310 and 315. Under such loads, only such squeezing force as is required to hold the pipe section and split ring within the housing is applied to the pipe section. This squeezing force is uniformly distributed over the interface between the split ring and the groove to avoid any high stress concentrations under such loading conditions.

Figure 11:
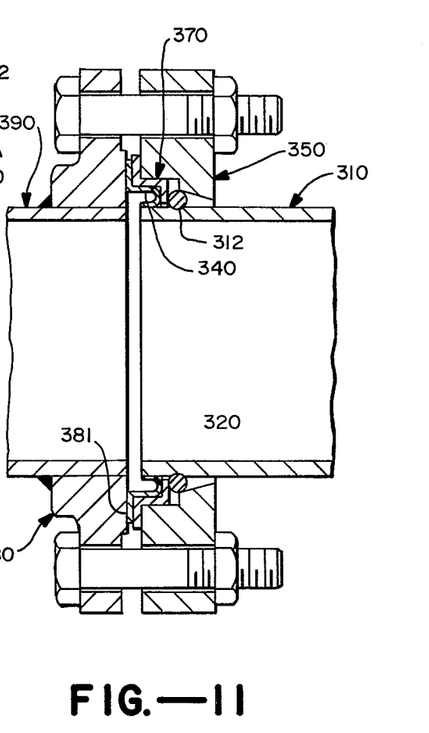
FIG. 11 is a sectioned elevational view illustrating an alternative embodiment of a pipe joint assembly in accordance with this invention involving a joint made with a standard flange.

FIG. 11 specifically illustrates that the coupling assembly of this invention can be utilized to couple an unflanged pipe section 310 to a standard flanged pipe section 390 which has a standard pipe flange 380 welded thereto.

Referring back to FIG. 10, it is preferable that the front flange portion 371 of the keeper ring 370A, and the corresponding front flange portion on the keeper ring 370B have an outer diameter such that the flange extends almost to the edge of the bolt holes in the housings. By doing so the coupling thrust forces are applied across a broad thrust-bearing surface which reduces the tendency of the walls of the housing to deflect at this location due to the concentration of stress applied by the bottom surface portions of the head of the bolt 361 and the nut 362.

To test the holding strength of a coupling system in accordance with this invention, a test was performed on an embodiment of this system generally corresponding to the arrangement shown in FIG. 10. The test was a simulated one using two housings such as housings 350 shown in FIG. 10 mounted on opposite ends of a pipe section which was about ten inches long. Blind flanges were coupled to the housings and solid steel bars were attached to the opposite ends of the two blind flanges to provide for mounting the test arrangement in a 400 kip Baldwin Universal Testing Machine. No sealing rings corresponding to sealing ring 340A were included in the test assembly since this was a simulated test. The keeper ring 370A was utilized with generally the structure shown in FIG. 10.

The dimensions of the components utilized were as follows. The pipe section was a four and one-half inch outer diameter pipe section about ten inches long and having a wall thickness of 0.237 inch. Grooves about one-sixteenth inch deep were formed in the outer walls of the ends of the pipe sections about three-quarters of an inch from the ends thereof. The split rings had a cross-sectional diameter of 0.262 inches. The outside diameter of the housing was nine inches with a bolt circle diameter of 7.5 inches. The bolt hole diameter was 0.75 inches and eight bolts having a diameter of 0.625 inches were utilized in the bolt holes.

The angle of the tapered inner surface of the housing was about twelve degrees for a total included angle of twenty-four degrees. The tapered surface portion of the housing was about 0.625 inches in width and the width of the counterbored cavity was about 0.75 inches. Thus the total thickness of the housing was about one and three-eighths inches. All of these dimensions are in accordance with the American National Standards Institute Specifications ANSI-B16.5.

During a first test on two separate specimens, maximum total loads of 34,000 and almost 40,000 pounds were applied to the coupling assemblies before failure occurred. In this initial testing, no attempt was made to simulate any internal pressure of a fluid within the pipe. The squeezing effect of the tapered inner surface of the housing on the split ring and, accordingly, on the pipe section caused the walls of the pipe section to be squeezed to a substantially smaller diameter with a major, permanent distortion produced in the split rings.

In a subsequent test solid metal rod sections were inserted into the pipe sections to resist the squeezing force on the wall sections and simulate internal fluid pressure. In this second test the maximum load carried was 51,200 pounds. At this load point the housing had separated from the adjacent flange. After testing was completed, it was noted that all of the five-eighths inch diameter bolts were loose. Accordingly, it appeared that the bolts themselves had stretched to produce the loosening of the housing from the flange to which it was coupled. However, no separation between the pipe section and the housing had occurred. When the components were disassembled, however, it was noted that the steel split ring had traveled a substantial distance over the tapered inner surface of the housing and that tapered inner surface had yielded to an enlarged diameter. However, sufficient material still remained in the back end of the tapered wall section to hold the housing on the split ring so that the components did not separate.

The maximum load of 51,200 pounds placed on the coupling assembly of this invention corresponds to an internal pressure in the four and one-half inch pipe of about 3,100 pounds per square inch. This demonstrates that the coupling assembly of this invention has a very substantial holding power which is sufficient to hold the housing on the pipe section under difficult inservice pipe conditions. The holding power of coupled pipe joints of this invention should substantially exceed the service ratings of comparable flanged pipe according to ANSI-B16.5 standards, (e.g. 255 PSI at 150° F.).

Figure 12:
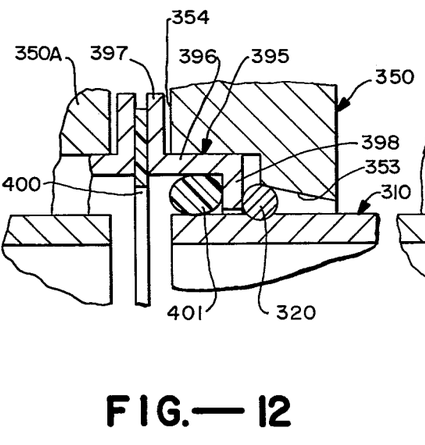
FIGS. 12 and 13 are sectioned elevational views of a portion of another alternative embodiment of a pipe joint assembly in accordance with this invention.
Figure 13:
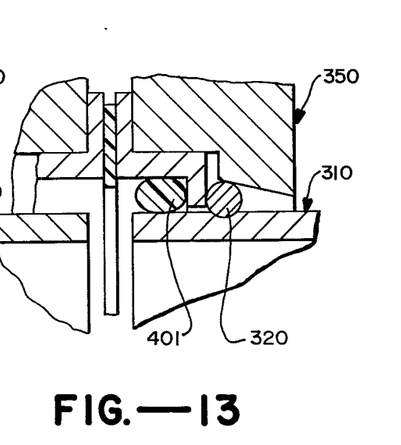

FIGS. 12 and 13 illustrate an alternative embodiment of the type of coupling system arrangement shown in FIG. 10. In the embodiment shown in FIG. 12, the main body portion 396 of the keeper ring 395 has a length such that the back surface of the outwardly extending flange section 397 is displaced from the front surface 354 of the housing 350 when the back flange portion 398 is in contact with the split ring 312. As a result, as the housing 350 is clamped toward the housing 350A, the initial clamping thrust will be applied between the tapered inner surface of the housing 350 and the keeper ring 395. This causes the tapered inner surface 353 to begin to ride slightly over the split ring 312 as the two housings 350 and 350A are being clamped together as shown in FIG. 13. As a result an initial substantial squeezing force is applied by the tapered inner surface 353 to the split ring 312 and thus to the pipe section 310. The magnitude of this initial squeezing force will be in part dependent on the separation distance between the flange portion 397 and the front surface 354 of the housing 350 since this determines the degree of travel of the housing before the front face 354 begins to put direct thrust on the thrust-bearing flange portion 397. Once this has occurred no additional squeezing force will be applied to the split ring since all additional thrust will be applied directly to the trust-bearing flanges on the keeper rings being clamped together by the fastening means through the action of the housings.

It is believed that in most installations of pipe sections utilizing the coupling system of this invention, it will be desirable to make the sealed joint without any substantial squeezing force initially being put on the split rings. This avoids any stressing of the ends of the pipe section during initial installation and thus reduces the chances of any stress-induced cracking or other failure mechanism in the pipe both during initial installation and after fluid pressure loads increase the wall stresses due to increases in squeezing forces of the split rings.

While the principles of this invention have been illustrated above in descriptions of various alternative embodiments, it should be understood that persons of ordinary skill in this art could make numerous modifications in the disclosed embodiments and could design other numerous embodiments without departing from the scope of this invention as set forth in the following claims.

What is claimed is:

1. In a coupling assembly for coupling an elongated cylindrical first element to a second element having a front-facing thrust-bearing surface thereon extending radially outside the outer diameter of said first element, a shallow circumferential groove formed on an outer circumferential surface of said first element at a position spaced a moderate distance from the front end of said first element at which said coupling is to be made; at least one split ring mounted in said groove and having an outer circumferential surface portion tapering radially inward in a direction away from said front end of said first element; and a housing-fastener assembly, including a generally hollow cylindrical housing mounted over said split ring and having an inner surface portion tapering radially inward in a direction away from a front surface of said housing and contacting at least a portion of said tapering outer surface of said split ring, fastening means for mounting said housing to said second element with a coupling force applied therebetween, and thrust-bearing means defining at least one front-facing, thrust-bearing surface on said housing-fastener assembly at a location opposite said thrust bearing surface on said second element and displaced a short distance forward of and radially spaced from said front end of said first element, said repetitive thrust bearing surfaces being urged into thrust-bearing engagement with each other by said coupling force to take the thrust force of said fastening means and to displace said front end of said first element away from said second element; said tapered inner surface portion of said housing defining an angle with respect to the axis of said first element substantially less than twenty degrees and thereby producing a strong radial squeezing force of said split ring on said first element in response to load forces tending to separate said first and second elements.

2. A coupling assembly as claimed in claim 1, wherein said thrust-bearing means comprises ring means mounted over said front end of said first element and extending between said split ring and said thrust-bearing surface on said second element with a front portion thereof substantially overlapping said front end of said first element and said front surface of said housing to maintain a separation between said first and second elements; said fastening means including means drawing said housing toward said second element and thereby compressing said thrust ring and said split ring between said thrust-bearing surface of said second element and said tapered inner surface of said housing to cause a substantial initial radial squeezing force of said split ring on said first element in absence of any load forces tending to separate said first and second elements with an increase in said radial squeezing force in the presence of such load forces.

3. A coupling assembly as claimed in claim 1, wherein said split ring has a generally circular cross-section; and said shallow groove has a rounded longitudinal cross-section substantially matching a bottom surface portion of said split ring, said tapered inner surface portion of said housing being positioned such that a region on said tapered inner surface contacts an outer surface portion of said split ring at an intermediate location between front and rear surfaces of said housing; said thrust-bearing means includes a thrust bearing surface portion of a front facing surface of said housing such that said coupling force of said fastener means is applied as thrust force to said housing with said split ring being isolated from said thrust force, whereby said first and second elements are coupled together with substantial coupling force without producing any substantial initial radial squeezing force of said split ring onto said first element.

4. A coupling assembly as claimed in claim 3, wherein said thrust-bearing means further includes keeper ring means mounted over said front end of said first element and defining a front thrust-bearing surface adjacent said thrust bearing surface of said housing, said keeper ring means including wall portions contacting a front surface of said split ring to keep said split ring in said shallow groove as said housing and said second element are being coupled together, but without applying any thrust force to said split ring.

5. A coupling assembly as claimed in claim 3, wherein said first element is a cylindrical pipe section; said second element is a flange having said thrust-bearing surface on a front face thereof; and said coupling assembly is adapted to provide a sealed joint between said pipe section and said flange; said assembly further comprising sealing means disposed over said cylindrical pipe section between said split ring and said free end of said pipe section for providing a seal against leakage of fluid from said pipe section at said pipe-flange joint, said sealing means including gasket means compressed between said respective thrust-bearing surfaces on said flange and said housing-fastener assembly.

6. A coupling assembly as claimed in claim 5, wherein said sealing means comprises a metal sealing ring formed from a thin sheet of flexible metal into a generally U-shaped cross-section with a radially outward extending flange portion on an outer front edge thereof; said sealing ring having an inner diameter substantially matching the outer diameter of said pipe section and an outer diameter substantially matching the inner diameter of said hollow housing; said thrust-bearing means comprises a front surface portion of said housing; and said flange portion on said sealing ring being compressed between said thrust-bearing surfaces on said flange and said housing to form a fluid tight seal thereat; said inner surface of said sealing ring forming a fluid tight seal with the outer surface of said pipe section and being assisted in such sealing action by pressure from fluid entering the interior of said sealing ring from said free end of said pipe section.

7. A coupling assembly as claimed in claim 5, wherein said pipe section is a thick-walled metal pipe; said shallow groove has a maximum depth of about one-sixteenth of an inch; and said angle of said tapered inner surface of said housing is in the range between about five degrees and about fifteen degrees.

8. A coupling assembly as claimed in claim 4, wherein said first element is a cylindrical pipe section; said second element is a flange having said thrust-bearing surface on a front face thereof; and said coupling assembly is adapted to provide a sealed joint between said pipe section and said flange; said hollow housing has a central cavity with a rear portion including said tapering inner surface portion and a front portion receiving a portion of said keeper ring means; said keeper ring means having a cylindrical main body portion with an inner surface of a diameter substantially greater than the outer diameter of said pipe section to form a cavity therebetween, a circumferential flange portion extending radially outward at a front end thereof and abutting said front thrust bearing surface of said housing to form a portion of said thrust-bearing means of said housing-fastener assembly, and a flange portion extending radially inward at a rear end thereof and abutting a front surface of said split ring; and said coupling assembly further comprises sealing means disposed in said cavity for providing a seal against leakage of fluid from said free end of said pipe section at said pipe-flange joint.

9. A coupling assembly as claimed in claim 8, wherein said sealing means includes gasket means compressed between said respective thrust-bearing surfaces on said flange and said keeper ring means to form a fluid tight seal thereat.

10. A coupling assembly as claimed in claim 8, wherein said sealing means comprises a metal sealing ring formed from a thin sheet of flexible metal into a generally U-shaped cross-section with a radially outward extending flange portion on an outer front edge thereof; said sealing ring having an inner diameter substantially matching the outer diameter of said pipe section and an outer diameter substantially matching the inner diameter of said cavity; said flange portion on said sealing ring being compressed between said thrust-bearing surfaces on said keeper ring and said flange to form a fluid tight seal thereat, and said inner surface of said sealing ring forming a fluid tight seal with the outer surface of said pipe section and being assisted in such sealing action by pressure from fluid entering the interior of said sealing ring from said free end of said pipe section.

11. A coupling assembly as claimed in claim 8, wherein said pipe section is a thick-walled metal pipe; said shallow groove has a maximum depth of about one-sixteenth of an inch; and said angle of said tapered surface portion of said housing cavity is in the range between about five degrees and about fifteen degrees.

12. In a coupling assembly for coupling together a pair of cylindrical hollow pipe sections to provide a fluid-tight joint, a shallow circumferential groove formed on an outer circumferential surface of each of said pipe section at a position spaced a moderate distance from the facing front ends thereof at which said coupling is to be made; at least one split ring mounted in each said groove and having an outer circumferential surface portion tapering radially inward in a direction away from said front end of said first element; a housing-fastener assembly, including first and second generally hollow cylindrical housings each mounted over one of said split rings and having an inner surface portion tapering radially inward in a direction away from a front surface of said housing and contacting at least a portion of said tapering outer surface of an associated one of said split rings, fastening means for mounting said housings together with a coupling force therebetween, thrust-bearing means associated with each of said housings for defining at least one pair of front-facing, thrust-bearing surfaces which are displaced forward of said front ends of said pipe sections and are urged into thrust bearing engagement by said coupling force to maintain said front ends of said pipe section in spaced, unclamped relation to each other; and sealing means disposed at least partially over and in contact with outer circumferential surfaces of said front ends of said cylindrical pipe sections to provide a seal against leakage of fluid from said free unclamped ends of said pipe sections, said tapered inner surface portion of said housings defining an angle with respect to the axis of said pipe sections substantially less than twenty degrees, thereby producing a strong radial squeezing force of said split rings on said pipe sections in response to lead forces tending to separate said pipe sections.

13. A coupling assembly as claimed in claim 12, wherein said split rings have a generally circular cross-section; and said shallow grooves have a rounded longitudinal cross-section substantially matching a bottom surface portion of said split rings, said tapered inner surface portion of said housing being positioned such that a region on said tapered inner surface contacts an outer surface portion of said split ring at an intermediate location between fron and rear surfaces of said housing; said thrust-bearing means includes a thrust bearing surface portion of a front facing surface of each of said housings such that said coupling force of said fastener means is applied as thrust force to said housings with said split ring being isolated from said thrust force whereby said pipe sections are joined together without producing any substantial initial radial squeezing force of said split rings onto said pipe sections.

14. A coupling assembly as claimed in claim 13, wherein said sealing means including gasket means compressed between said pair of thrust-bearing surfaces on said flange and said housing-fastener assembly.

15. A coupling assembly as claimed in claim 13, wherein said sealing means comprises a pair of metal sealing rings each formed from a thin sheet of flexible metal into a generally U-shaped cross-section with a radially outward extending flange portion on an outer front edge thereof; said sealing rings having an inner diameter substantially matching the outer diameter of said pipe sections and an outer diameter substantially matching the inner diameter of said hollow housings; said flange portions on said sealing rings being compressed between said thrust-bearing surfaces to form a fluid tight seal thereat; said inner surfaces of said sealing rings forming a fluid tight seal with associated outer surfaces of said pipe sections and being assisted in such sealing action by pressure from fluid entering the interior of said sealing rings from said free ends of said pipe sections.

16. A coupling assembly as claimed in claim 13, wherein said pipe sections are thick-walled metal pipe; said shallow grooves have a maximum depth of about one-sixteenth of an inch; and said angle of said tapered inner surfaces of said housings is in the range between about five degrees and about fifteen degrees.

17. A coupling assembly as claimed in claim 13, wherein said thrust bearing means further includes a pair of keeper ring means mounted over said front ends of said pipe sections each of said keeper ring means defining a front thrust bearing surface adjacent said thrust bearing surface portion of an associated housing and including wall portions contacting a front surface of an associated split ring to keep said split ring in said shallow groove as said housings are coupled together, but without applying any thrust force to said split ring.

18. A coupling assembly as claimed in claim 17, wherein each of said hollow housings has a central cavity with a rear portion including said tapering inner surface portion and a front portion receiving a portion of an associated one of said keeper ring means; each of said keeper ring means having a cylindrical main body portion with an inner surface of a diameter substantially greater than the outer diameter of said pipe section to form a cavity therebetween, a circumferential flange portion extending radially outward at a front end thereof and abutting a front surface of an associated housing to form said front facing thrust-bearing surface of said thrust-bearing means, and a flange portion extending radially inward at a rear end thereof and abutting a front surface of an associated split ring; and said sealing means is disposed in said cavities.

19. A coupling assembly as claimed in claim 18, wherein said sealing means includes gasket means compressed between said respective thrust-bearing surfaces on said flanges of said keeper ring means to form a fluid tight seal thereat.

20. A coupling assembly as claimed in claim 18, wherein said sealing means comprises a pair of metal sealing rings each formed from a thin sheet of flexible metal into a generally U-shaped cross-section with a radially outward extending flange portion on an outer front edge thereof; each said sealing ring having an inner diameter substantially matching the outer diameter of an associated one of said pipe sections and an outer diameter substantially matching the inner diameter of said cavities; said flange portions on said sealing rings being compressed between said thrust-bearing surfaces on said keeper rings to form a fluid tight seal thereat, and said inner surfaces of said sealing rings forming a fluid tight seal with the outer surfaces of said pipe sections and being assisted in such sealing action by pressure from fluid entering the interior of said sealing rings from said free ends of said pipe sections.

21. A coupling assembly as claimed in claim 18, wherein said pipe sections are thick-walled metal pipe; said shallow grooves have a maximum depth of about one-sixteenth of an inch; and said angle of said tapered surface portion of said housing cavity is in the range between about five degrees and about fifteen degrees.

22. In a piping system, in combination, pipe components such as T-couplings, crosses, elbows and valves, and a kit of parts for providing fluid tight joints between said pipe components and straight pipe sections and between pairs of pipe components, each of said pipe components having a straight free end section with a shallow circumferential groove formed therein a short distance from the end thereof, said kit of parts including a plurality of split rings each adapted from mounting in one of said grooves formed on free ends of said pipe components or in a similar groove formed on a straight pipe section, a plurality of housing-fastener assemblies, each including a pair of hollow cylindrical housings adapted to be mounted over said split rings and having an inner surface portion tapering radially inward in a direction away from a front surface of said housing an adapted to contact at least a portion of said tapering outer surface portion of said split ring, fastening means for drawing said housings together with a coupling force therebetween, thrust-bearing means providing a front-facing thrust-bearing surface on each housing fastener assembly at a location displaced a short distance forward of the front end of a pipe component when said tapered inner surface of said housing is in contact with said split ring and respective thrust bearing surfaces are urged into thrust bearing engagement by said coupling force to maintain a separation between the ends of two pipe components being coupled together, and sealing means adapted to be mounted at least partially over and in contact with outer circumferential surfaces of adjacent ends of pipe sections, adjacent ends of a pipe component and a pipe section, or adjacent ends of pipe components for providing a seal against leakage of fluid at said joint, said tapered inner surface portions of said housings defining an angle with respect to the axis of the housing substantially less than twenty degrees, thereby producing a strong radial squeezing force of said split rings on said pipe sections in response to load forces tending to separate components coupled together.

* * * * *

UNITED STATES PATENT AND TRADEMARK OFFICE
CERTIFICATE OF CORRECTION

PATENT NO. : 4,448,448
DATED : May 15, 1984
INVENTOR(S) : Andrew A. Pollia

It is certified that error appears in the above-identified patent and that said Letters Patent is hereby corrected as shown below:

Column 23, line 48, between "to" and "forces" delete the word "lead" and substitute therefor -- load --.

Column 23, line 58, "fron" should read -- front --.

Signed and Sealed this

Twelfth Day of March 1985

[SEAL]

Attest:

DONALD J. QUIGG

Attesting Officer    Acting Commissioner of Patents and Trademarks